(12) United States Patent
Wang (10) Patent No.: US 10,254,959 B2
(45) Date of Patent: Apr. 9, 2019

(54) METHOD OF INPUTTING A CHARACTER INTO A TEXT STRING USING A SLIDING TOUCH GESTURE, AND ELECTRONIC DEVICE THEREFOR (71) Applicant: Huawei Device (Dongguan) Co., Ltd., Dongguan (CN)

(72) Inventor: Hao Wang, Wuhan (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 157 days.

(21) Appl. No.: 15/113,588

(22) PCT Filed: Jan. 24, 2014

(86) PCT No.: PCT/CN2014/071307
§ 371 (c)(1),
(2) Date: Jul. 22, 2016

(87) PCT Pub. No.: WO2015/109507
PCT Pub. Date: Jul. 30, 2015

(65) Prior Publication Data
US 2017/0010805 A1 Jan. 12, 2017

(51) Int. Cl.
*G06F 3/01* (2006.01)
*G06F 3/023* (2006.01)
*G06F 3/0488* (2013.01)

(52) U.S. Cl.
CPC .......... *G06F 3/04886* (2013.01); *G06F 3/018* (2013.01); *G06F 3/0236* (2013.01);
(Continued)

(58) Field of Classification Search
CPC .. G06F 3/04886; G06F 3/0237; G06F 3/0236; G06F 3/018; G06F 2203/04805
See application file for complete search history.

(56) References Cited

U.S. PATENT DOCUMENTS 5,561,444 A * 10/1996 Johnston, Jr. ......... G06F 3/0486
345/660
6,377,243 B1 4/2002 Tomoda et al.
(Continued)

FOREIGN PATENT DOCUMENTS

| CN | 102281347 A | 12/2011 |
| CN | 103080893 A | 5/2013 |
| WO | 2008013658 A2 | 1/2008 |

OTHER PUBLICATIONS

Baig, E.C. et al., " iPhone for Dummies-Excerpts," Iphone for Dummies, 3rd ed, Jan. 1, 2009, © 2009, Wiley Publishing Inc., Indianapolis, Indiana, 5 pages.

*Primary Examiner* — Asher D Kells
(74) *Attorney, Agent, or Firm* — Slater Matsil, LLP (57) ABSTRACT

Embodiments provide a character input method and an electronic device. The method includes acquiring a character input instruction, and displaying candidate characters generated by the character input instruction. The method also includes acquiring a first instruction input by a user, where the first instruction is used to select at least one target candidate character in the candidate characters. The method also includes acquiring a sliding gesture input by the user, and determining, according to the sliding gesture, a sliding track corresponding to the sliding gesture, where the sliding track is a track formed by action points of the sliding gesture on an output device. The method also includes acquiring, according to the sliding track, a position that is selected by the user for inputting a character, and inputting the at least one target candidate character to the position that is selected by the user for inputting a character.

16 Claims, 2 Drawing Sheets

(52) U.S. Cl.
CPC .......... *G06F 3/0237* (2013.01); *G06F 3/0488* (2013.01); *G06F 3/04883* (2013.01); *G06F 2203/04805* (2013.01)

(56) References Cited

U.S. PATENT DOCUMENTS

| | | | |
|---|---|---|---|
| 9,766,780 B2* | 9/2017 | Kusano | G06F 3/0482 |
| 2009/0048000 A1* | 2/2009 | Ade-Hall | G06F 3/0236 |
| | | | 455/566 |
| 2009/0249232 A1 | 10/2009 | Lundy et al. | |
| 2010/0235726 A1* | 9/2010 | Ording | G06F 1/1626 |
| | | | 715/234 |
| 2010/0281416 A1* | 11/2010 | Fuyuno | G06F 1/162 |
| | | | 715/773 |
| 2010/0287486 A1* | 11/2010 | Coddington | G06F 3/0236 |
| | | | 715/769 |
| 2011/0320978 A1* | 12/2011 | Horodezky | G06F 3/0488 |
| | | | 715/823 |
| 2012/0206382 A1* | 8/2012 | Kusano | G06F 3/0236 |
| | | | 345/173 |
| 2013/0179778 A1 | 7/2013 | Lee et al. | |
| 2013/0241838 A1* | 9/2013 | Onishi | G06F 3/0236 |
| | | | 345/169 |
| 2013/0249832 A1* | 9/2013 | Nakamura | G06F 17/276 |
| | | | 345/173 |
| 2014/0013216 A1* | 1/2014 | Sakuta | G06F 3/0483 |
| | | | 715/252 |
| 2016/0378312 A1* | 12/2016 | Katsuyama | G06F 17/21 |
| | | | 715/800 |
| 2016/0378336 A1* | 12/2016 | Katsuyama | G06F 3/04883 |
| | | | 345/472 |
| 2017/0364217 A1* | 12/2017 | Kusano | G06F 3/0488 |

* cited by examiner

METHOD OF INPUTTING A CHARACTER INTO A TEXT STRING USING A SLIDING TOUCH GESTURE, AND ELECTRONIC DEVICE THEREFOR

CROSS-REFERENCE TO RELATED APPLICATIONS

This patent application is a national phase filing under section 371 of PCT/CN2014/071307, filed on Jan. 24, 2014, entitled "Character Input Method And Electronic Device", which is incorporated herein by reference in its entirety.

TECHNICAL FIELD

The present invention relates to the field of mobile terminals, and in particular, to a character input method and an electronic device.

BACKGROUND

During daily use of an input method, there are often operations of inserting a character string into an existing text. In a current input method, a cursor is first moved to a position to which a character needs to be input; then, a to-be-input character is input; a candidate word is tapped, and the character string is input to a text box.

The development trend of current intelligent devices is simple and easy to operate, and it is required that a user using a smart phone directly uses the smart phone without reading an instruction.

Therefore, in a process of inputting a character, the user first needs to insert the cursor into the position for inputting a character, and then inputs the corresponding character, causing a relatively complex operation and low operation efficiency.

SUMMARY

An objective of the present invention is to provide a character input method and an electronic device, to resolve a problem in the prior art that operation efficiency is low because a user needs to first insert a cursor into a preset position and then input a character.

According to a first aspect, a character input method is provided. The method includes acquiring a character input instruction, and displaying candidate characters generated according to the character input instruction. The method also includes acquiring a first instruction input by a user, where the first instruction is used to select at least one target candidate character in the candidate characters. The method also includes acquiring a sliding gesture input by the user, and determining, according to the sliding gesture, a sliding track corresponding to the sliding gesture, where the sliding track is a track formed by action points of the sliding gesture on an output device. The method also includes acquiring, according to the sliding track, a position that is selected by the user for inputting a character. The method also includes inputting the at least one target candidate character to the position that is selected by the user for inputting a character.

With reference to the first aspect, in a first possible implementation manner of the first aspect, the position that is selected by the user for inputting a character includes a position of a termination point of the sliding track. The inputting the at least one target candidate character to the position that is selected by the user for inputting a character includes: inputting the at least one target candidate character to the position of the termination point of the sliding track.

With reference to the first aspect or the first impossible implementation manner of the first aspect, in a second possible implementation manner of the first aspect, after the acquiring the at least one target candidate character in the candidate characters, acquiring a sliding gesture input by the user, and determining, according to the sliding gesture, a sliding track corresponding to the sliding gesture. Before the inputting the at least one target candidate character to the position that is selected by the user for inputting a character, the method further includes displaying the sliding track, and displaying an identifier of the at least one target candidate character on the sliding track.

With reference to the second possible implementation manner of the first aspect, in a third possible implementation manner of the first aspect, the identifier is the at least one target candidate character, and the method further includes: displaying the at least one target candidate character in a preset area.

With reference to the second possible implementation manner of the first aspect, in a fourth possible implementation manner of the first aspect, the identifier includes a position identifier of the at least one target candidate character on the output device.

With reference to the first aspect or the first possible implementation manner of the first aspect or the second possible implementation manner of the first aspect or the third possible implementation manner of the first aspect or the fourth possible implementation manner of the first aspect, in a fifth possible implementation manner of the first aspect, the method further includes using a position of the action points of the sliding gesture on the output device as a center, and magnifying a view of content displayed on the output device in a preset range.

According to a second aspect, an electronic device in provided. The device includes a first acquiring unit, configured to acquire a character input instruction. The device also includes a first displaying unit, configured to display candidate characters generated according to the character input instruction. The device also includes a second acquiring unit, configured to acquire a first instruction input by a user, where the first instruction is used to select at least one target candidate character in the candidate characters. The device also includes a third acquiring unit, configured to acquire a sliding gesture input by the user, and determine, according to the sliding gesture, a sliding track corresponding to the sliding gesture, where the sliding track is a track formed by action points of the sliding gesture on an output device. The device also includes a fourth acquiring unit, configured to acquire, according to the sliding track, a position that is selected by the user for inputting a character. The device also includes an inputting unit, configured to input the at least one target candidate character to the position that is selected by the user for inputting a character.

With reference to the second aspect, in a first possible implementation manner of the second aspect, the position that is selected by the user for inputting a character includes a position of a termination point of the sliding track; and the inputting, by the inputting unit, the at least one target candidate character to the position that is selected by the user for inputting a character includes: inputting, by the inputting unit, the at least one target candidate character to the position of the termination point of the sliding track.

With reference to the second aspect or the first possible implementation manner of the second aspect, in a second possible implementation manner of the second aspect, the electronic device further includes: a second displaying unit, configured to display the sliding track; and a third displaying unit, configured to display an identifier of the at least one target candidate character according to the sliding track.

With reference to the second possible implementation manner of the second aspect, in a third possible implementation manner of the second aspect, the third displaying unit is further configured to: display the at least one target candidate character in a preset area.

With reference to the second possible implementation manner of the second aspect, in a fourth possible implementation manner of the second aspect, the identifier includes: a position identifier of the at least one target candidate character on the output device.

With reference to the second aspect or the first possible implementation manner of the second aspect or the second possible implementation manner of the second aspect or the third possible implementation manner of the second aspect or the fourth possible implementation manner of the second aspect, in a fifth possible implementation manner of the second aspect, the electronic device further includes a fourth displaying unit, where the fourth displaying unit is further configured to: use a position of the action points of the sliding gesture on the output device as a center, and magnify a view of content displayed on the output device in a preset range.

The present invention provides the character input method. In the method, a character input instruction is acquired, and candidate characters generated according to the character input instruction are displayed; a first instruction input by a user is acquired, where the first instruction is used to select at least one target candidate character in the candidate characters; a sliding gesture input by the user is acquired, and a sliding track corresponding to the sliding gesture is determined according to the sliding gesture, where the sliding track is a track formed by action points of the sliding gesture on an output device; a position that is selected by the user for inputting a character is acquired according to the sliding track; and the at least one target candidate character is input to the position that is selected by the user for inputting a character. Therefore, in a case in which an input cursor is not triggered, a character that needs to be input by a user is input to a position specified by the user, thereby improving the operation efficiency.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

The following descriptions are merely exemplary embodiments of the present invention, but are not intended to limit the present invention. Any modification, equivalent replacement, or improvement made without departing from the spirit and principle of the present invention should fall within the protection scope of the present invention.

Figure 1:
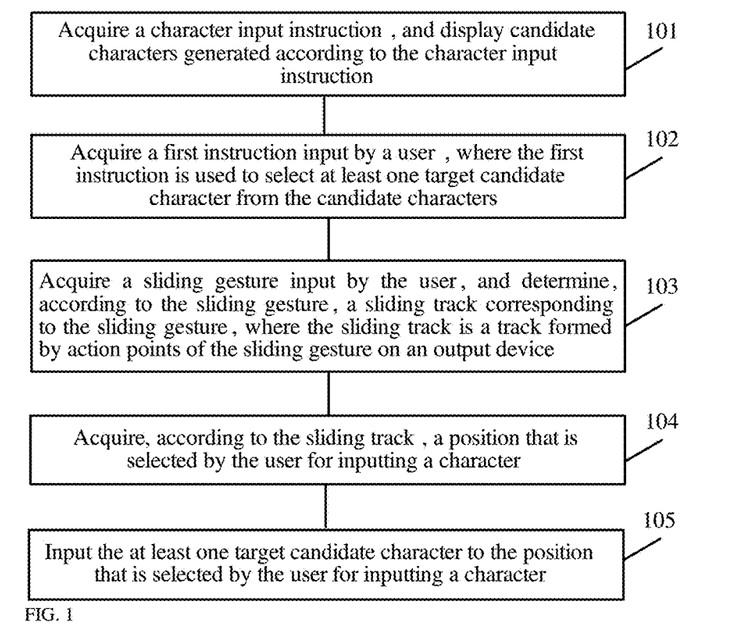
FIG. 1 is a flowchart of a character input method according to an embodiment of the present invention.

Referring to FIG. 1, FIG. 1 is a flowchart of a character input method according to an embodiment of the present invention. As shown in FIG. 1, the method includes the following steps.

Step 101: Acquire a character input instruction, and display candidate characters generated according to the character input instruction.

Specifically, when a user performs word editing, for example, in an application scenario of sending a short message service message, performing text editing, or sending a WeChat or Weibo message, an electronic device receives a character input instruction of the user, and displays the candidate characters in a candidate area of a user interface of the electronic device according to the instruction.

Figure 2:
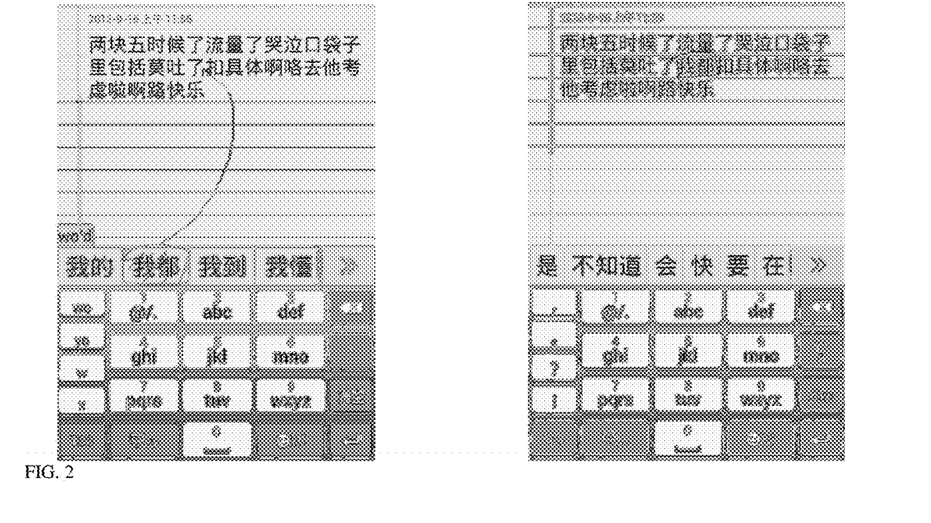
FIG. 2 is a schematic diagram of a character input method according to an embodiment of the present invention.

For example, in a case in which the user does not trigger an input cursor, the user taps a simulate keyboard of an input method, and the candidate characters that the user needs to input are displayed on a user interface. As shown in FIG. 2, FIG. 2 is a schematic diagram of the character input method according to this embodiment of the present invention. In the case in which a user does not trigger an input cursor, the user taps wo'd on a simulate keyboard of an input method, and then the user interface shows candidate characters, such as "我的" (mine, "我都" (I also), "我到" (I went to), and "我懂" (I know).

In an implementation manner of this embodiment of the present invention, the candidate characters may be Chinese characters or English words, or any characters displayed by the keyboard of the input method after an instruction input by the user is received.

Step 102: Acquire a first instruction input by a user, where the first instruction is used to select at least one target candidate character in the candidate characters.

Specifically, the user may determine the at least one target candidate character by means of a long press on the candidate characters, or determine the at least one target candidate character by tapping or double tapping the candidate characters, or determine the at least one target candidate character from the candidate characters in other possible implementation manners. For example, the user selects, on the user interface, the characters "我都" (I also) that need to be input, and long presses an area of the characters "我都" (I also). In a case in which the electronic device obtains through monitoring that a touch event in the area of the characters "我都" (I also) is a long-touch event, the electronic device may perform an operation of copying the characters "我都" (I also) in the background. The target candidate character is a candidate character selected by the user, such as "我都" (I also) in FIG. 2.

Step 103: Acquire a sliding gesture input by the user, and determine, according to the sliding gesture, a sliding track corresponding to the sliding gesture, where the sliding track is a track formed by action points of the sliding gesture on an output device.

Specifically, the characters "我都" (I also) may move on the user interface along the sliding track of the user on the user interface of the electronic device.

Step 104: Acquire, according to the sliding track, a position that is selected by the user for inputting a character.

Specifically, a user device calculates, according to the sliding track of the user on the user interface, the position that is selected by the user for inputting a character.

Optionally, the position that is selected by the user for inputting a character may be at any position on the sliding track, for example, a position of a termination point of the sliding track, or a center position of the sliding track.

Step 105: Input the at least one target candidate character to the position that is selected by the user for inputting a character.

The inputting the at least one target candidate character to the position that is selected by the user for inputting a character includes: inputting the at least one target candidate character to the position of the termination point of the sliding track.

Specifically, the user device may calculate a position in which the user leaves a user interface of a dragged candidate character as the position that is selected by the user for inputting a character. As shown in FIG. 2, in a case in which the candidate characters selected by the user are "我都" (I also), the user drags "我都" (I also) on an input interface to a position behind the characters "吐了" and releases the finger, and the electronic device calculates the position that is selected by the user for inputting a character and pastes "吐了" (I also) behind the characters "我都".

This embodiment of the present invention provides the character input method. In the method, a character input instruction is acquired, and candidate characters generated according to the character input instruction are displayed; a first instruction input by a user is acquired, where the first instruction is used to select at least one target candidate character in the candidate characters; a sliding gesture input by the user is acquired, and a sliding track corresponding to the sliding gesture is determined according to the sliding gesture, where the sliding track is a track formed by action points of the sliding gesture on an output device; a position that is selected by the user for inputting a character is acquired according to the sliding track; and the at least one target candidate character is input to the position that is selected by the user for inputting a character. Therefore, in a case in which an input cursor is not triggered, a character that needs to be input by a user is input to a position specified by the user, thereby improving the operation efficiency.

In an implementation manner of this embodiment of the present invention, optionally, after the acquiring at least one target candidate character in the candidate characters, acquiring a sliding gesture input by the user, and determining, according to the sliding gesture, a track corresponding to the sliding gesture, and before the inputting the at least one target candidate character to a position that is selected by the user for inputting a character, the method further includes: displaying the sliding track, and displaying an identifier of the at least one target candidate character on the sliding track.

Specifically, the electronic device may gradually display the sliding track with the sliding gesture of the user on the output device, and when gradually displaying the sliding track, the electronic device may display the identifier of the at least one target candidate character on the displayed sliding track along the sliding gesture, so that the identifier of the at least one target candidate character may move with the sliding gesture of the user.

Optionally, the identifier may be a position identifier of the at least one target candidate character on the output device. The position identifier is a relative position identifier of the at least one target candidate character in the candidate characters. Using FIG. 2 as an example, after the user selects "我都" (I also), in all the candidate characters, the target candidate characters "我都" (I also) are at the second position, that is, a Roman numeral "II" may be used as an identifier of "我都" (I also).

Further, the identifier is the at least one target candidate character, the method further includes: displaying the at least one target candidate character in a preset area.

Specifically, as shown in FIG. 2, the sliding track may be displayed on the user interface, and the at least one target candidate character of the characters "我都" (I also) is displayed in the preset area of the user interface. For example, in a case in which the candidate characters selected by the user are dragged, the target candidate characters selected by the user are displayed in the preset area of the interface of the electronic device, for example, a margin of an edit page. A manner of displaying the target candidate characters selected by the user may be: displaying the first character or at least one character of the target candidate characters selected by the user, so that the user may directly see the character input by the user, thereby improving accuracy of inputting a character by the user.

Alternatively, a position of the characters "我都" (I also) in the candidate characters is displayed on the user interface.

In the foregoing implementation manner of this embodiment of the present invention, further, the method further includes: using a position of the action points of the sliding gesture on the output device as a center, and magnifying a view of content displayed on the output device in a preset range.

Specifically, in a process in which the candidate characters selected by the user move on the user interface, the position of the action points of the sliding track on a touch screen when the user slides on the user interface of the electronic device is used as a center of a circle, and a view of content displayed in a circular range is magnified within a preset radius, so that the user can clearly know a position of a currently dragged character in a context, thereby improving the character inputting accuracy.

The action points of the sliding track on the touch screen are used as the center, and a view of the content displayed by the output device is magnified in the preset range, where the preset range may be a circle using the action points as the center, or may be a rectangle using the action points as an intersection point of diagonals, or may be another shape, which is not limited in this embodiment of the present invention.

The preset range may be a preset range set by the user, or may be a preset value that is automatically adjusted by the electronic device according to an edit page. The preset range may be a fixed value, or may be a specific interval range.

Figure 3:
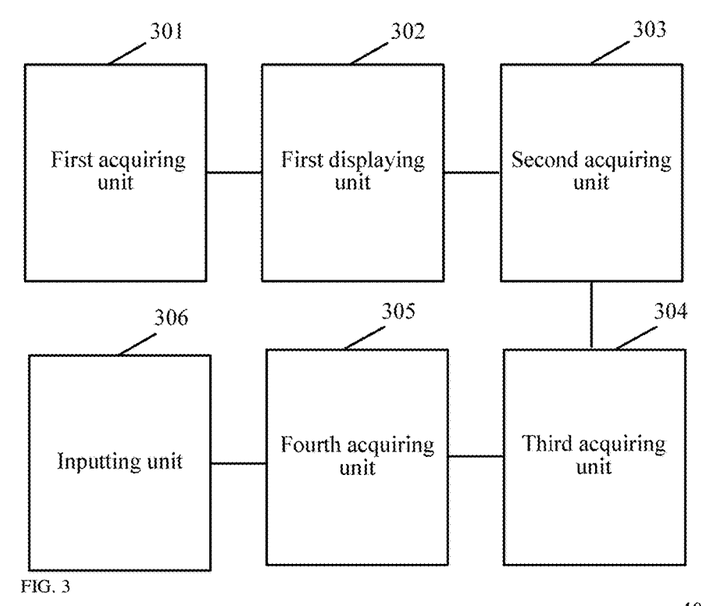
FIG. 3 is a diagram of an apparatus structure of an electronic device according to an embodiment of the present invention.

Referring to FIG. 3, FIG. 3 is a diagram of an apparatus structure of an electronic device according to an embodiment of the present invention. The electronic device includes the following units.

A first acquiring unit 301. The first acquiring unit 301 is configured to acquire a character input instruction.

A first displaying unit 302. The first displaying unit 302 is configured to display candidate characters generated according to the character input instruction.

Specifically, in a case in which the user needs to operate a cursor, for example, sending a short message service message, performing text editing, or sending a WeChat or Weibo message, an electronic device receives a character input instruction of the user, and displays the candidate characters in a candidate area of a user interface of the electronic device according to the instruction.

In a case in which the electronic device does not trigger a cursor, the user taps a keyboard of the input method, and the user interface shows the candidate characters that the user needs to input. For example, as shown in FIG. 2, FIG. 2 is a schematic diagram of the character input method according to this embodiment of the present invention. In a case in which the user does not trigger an input cursor, the user taps wo'd on a keyboard of an input method, the user interface shows "我的" (mine), "我都" (I also), "我到" (I went to), and "我懂" (I know), and the characters "我的" (mine), "我都" (I also), "我到" (I went to), and "我懂" (I know) that are shown on the user interface are the candidate characters. The candidate characters may be Chinese characters or English words, or any characters displayed by the keyboard of the input method after an instruction input by the user is received.

A second acquiring unit 303. The second acquiring unit 303 is configured to acquire a first instruction input by the user, where the first instruction is used to select at least one target candidate character in the candidate characters.

Specifically, the user selects, on the user interface, the characters "我都" (I also) that need to be input, and long presses an area of the characters "我都" (I also). In a case in which the electronic device obtains through monitoring that a touch event in the area of the characters "我都" (I also) is a long-touch event, the electronic device may perform an operation of copying the characters "我都" (I also) in the background, and the characters "我都" (I also) are the target candidate characters.

A third acquiring unit 304. The third acquiring unit 304 is configured to acquire a sliding gesture input by the user, and determine, according to the sliding gesture, a sliding track corresponding to the sliding gesture, where the sliding track is a track formed by action points of the sliding gesture on an output device.

Specifically, the characters "我都" (I also) move on the user interface along the sliding track of the user on the user interface of the electronic device.

A fourth acquiring unit 305. The fourth acquiring unit 305 is configured to acquire, according to the sliding track, a position that is selected by the user for inputting a character.

Specifically, a user device calculates, according to the sliding track of the user on the user interface, the position that is selected by the user for inputting a character.

A inputting unit 306. The inputting unit 306 is configured to input the at least one target candidate character to the position that is selected by the user for inputting a character.

Optionally, the position that is selected by the user for inputting a character includes a position of a termination point of the sliding track; and the inputting, by the inputting unit, the at least one target candidate character to the position that is selected by the user for inputting a character includes: inputting, by the inputting unit, the at least one target candidate character to the position of the termination point of the sliding track.

Specifically, the user device may calculate a position in which the user leaves a user interface of a dragged candidate character as the position that is selected by the user for inputting a character. As shown in FIG. 2, in a case in which the candidate characters selected by the user are "我都" (I also), the user drags "我都" (I also) on an input interface to a position behind the characters "吐了" and releases the finger, and the electronic device calculates the position that is selected by the user for inputting a character and pastes "我都" (I also) behind the characters "吐了".

This embodiment of the present invention provides the electronic device. The electronic device acquires a character input instruction, and displays candidate characters generated by the character input instruction; acquires a first instruction input by a user, where the first instruction is used to select at least one target candidate character in the candidate characters; acquires a sliding gesture input by the user, and determines, according to the sliding gesture, a sliding track corresponding to the sliding gesture, where the sliding track is a track formed by action points of the sliding gesture on an output device; acquires, according to the sliding track, a position that is selected by the user for inputting a character; and inputs the at least one target character to the position that is selected by the user for inputting a character. Therefore, in a case in which an input cursor is not triggered, a character that needs to be input by a user is input to a position specified by the user, thereby improving the operation efficiency.

Optionally, the electronic device further includes: a second displaying unit, configured to display the sliding track; and a third displaying unit, configured to display an identifier of the at least one target candidate character according to the sliding track.

Optionally, the third displaying unit is further configured to: display the at least one target candidate character in a preset area.

The identifier includes: a position identifier of the at least one target candidate character on the output device.

Specifically, as shown in FIG. 2, the sliding track may be displayed on the user interface, and the at least one target candidate character of the characters "我都" (I also) is displayed in the preset area of the user interface. For example, in a case in which the candidate characters selected by the user are dragged, the target candidate characters selected by the user are displayed on a user interface of the electronic device, and a manner of displaying the target candidate characters selected by the user may be: displaying the first or at least one of the target candidate characters selected by the user, so that the user can directly see the character input by the user, thereby improving experience of inputting a character by the user.

Alternatively, a position of the characters "我都" (I also) in the candidate characters is displayed on the user interface.

The electronic device further includes a fourth displaying unit, where the fourth displaying unit is further configured to: use a position of the action points of the sliding gesture on the output device as a center, and magnify a view of content displayed on the output device in a preset range.

Specifically, in a process in which the candidate characters selected by the user move on the user interface, the position of the action points of the sliding track on a touch screen when the user slides on the user interface of the electronic device is used as a center of a circle, and a view of content displayed in a circular range is magnified within a preset radius, so that the user can clearly know a position of a currently dragged character in a context, thereby improving the character inputting accuracy.

A sliding track of the user may be magnified by using position in which the candidate characters slide on the user interface of the electronic device as a center, and a shape after a magnification may be circular, or rectangle, or another shape.

Figure 4:
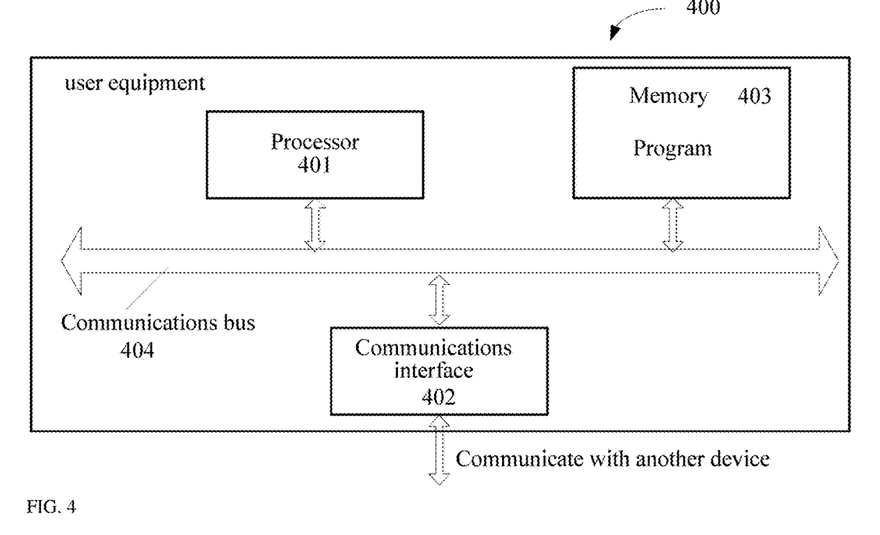
FIG. 4 is a diagram of an apparatus structure of an electronic device according to an embodiment of the present invention.

FIG. 4 is a diagram of an apparatus structure of an electronic device according to an embodiment of the present invention. Referring to FIG. 4, FIG. 4 shows an electronic device 400 provided by this embodiment of the present invention, and a specific embodiment of the present invention does not limit a specific implementation of the electronic device 400. The electronic device 400 includes: a processor 401, a communications interface 402, a memory 403, and a bus 404, where the processor 401, the communications interface 402, and the memory 403 implement mutual communication by means of the bus 404; the bus may be an industry standard architecture (ISA for short) bus, a peripheral component (PCI for short) bus, or an extended industry standard architecture (EISA for short) bus; the bus may be classified into an address bus, a data bus, a control bus, and the like, and for the convenience of representation, only one bold line is used for representation in FIG. 3, but it does not represent that there is only one bus or one type of bus.

The communications interface 402 is configured to communicate with another device.

The processor 401, the processor is a control center of the electronic device, connects parts of an entire electronic device by means of various interfaces and circuits, and executes various functions of the electronic device and/or process data by running or executing a software program and/or module stored in a storage unit and invoking data stored in the storage unit. The processor may include an integrated circuit (IC for short), for example, may include a single packaged IC, or may include multiple successive packaged ICs that have same functions or different functions. For example, the processor may include only a central processing unit (CPU for short), or may be a combination of a GPU, a digital signal processor (DSP for short), and a control chip (for example, a baseband chip) in a communications unit. In this embodiment of the present invention, the CPU may be of a single operation core, and may also include multiple operation cores. Specifically, the program may include program code, where the program code includes a computer operation instruction. The processor 401 may be a central processing unit (CPU, for short), or an application specific integrated circuit ASIC, or one or more integrated circuits configured to implement this embodiment of the present invention.

The memory 403 is configured to store the program. The processor 403 may be a volatile memory, for example, a random access memory (RAM), or a non-volatile memory, for example, a read-only memory (ROM), a flash memory, a hard disk drive (HDD), or a solid-state drive (SSD). The processor 401 executes the following method according to the program instruction stored in the memory 403. The method includes acquiring a character input instruction, and displaying candidate characters generated according to the character input instruction; acquiring a first instruction input by a user, where the first instruction is used to select at least one target candidate character in the candidate characters. The method also includes acquiring a sliding gesture input by the user, and determining, according to the sliding gesture, a sliding track corresponding to the sliding gesture, where the sliding track is a track formed by action points of the sliding gesture on an output device. The method also includes acquiring, according to the sliding track, a position that is selected by the user for inputting a character; and inputting the at least one target candidate character to the position that is selected by the user for inputting a character.

The position of inputting the character selected by the user includes a position of a termination point of the sliding track; and the inputting the at least one target candidate character to the position that is selected by the user for inputting a character includes: inputting the at least one target candidate character to the position of the termination point of the sliding track.

After the acquiring the at least one target candidate character in the candidate characters, acquiring a sliding gesture input by the user, and determining, according to the sliding gesture, a track corresponding to the sliding gesture, and before the inputting the at least one target candidate character to the position that is selected by the user for inputting a character, the method further includes: displaying the sliding track; and displaying an identifier of the at least one target candidate character on the sliding track.

Further, the identifier is the at least one target candidate character, the method further includes: displaying the at least one target candidate character in a preset area.

The identifier includes: a position identifier of the at least one target candidate character on the output device.

The method further includes: using a position of the action points of the sliding gesture on the output device as a center, and magnifying a view of content displayed on the output device in a preset range.

This embodiment of the present invention provides the electronic device. The electronic device acquires a character input instruction, and displays candidate characters generated by the character input instruction; acquires a first instruction input by a user, where the first instruction is used to select at least one target candidate character in the candidate characters; acquires a sliding gesture input by the user, and determines, according to the sliding gesture, a sliding track corresponding to the sliding gesture, where the sliding track is a track formed by action points of the sliding gesture on an output device; acquires, according to the sliding track, a position that is selected by the user for inputting a character; and inputs the at least one target character to the position that is selected by the user for inputting a character. Therefore, in a case in which an input cursor is not triggered, a character that needs to be input by a user is input to a position specified by the user, thereby improving the operation efficiency.

It needs to be noted that mutual reference may be made to corresponding technical features in the foregoing embodiments of the present invention.

The technical solutions of the embodiments of the present invention are not limited to an application scenario of editing a short message service message in the accompanying drawings, and may also be applied to an application scenario of text editing, an application scenario of editing a WeChat message, an application scenario of editing a Weibo message, or the like, and the application may further include a corresponding application scenario of character inputting generalized from this scenario.

The foregoing descriptions are merely preferred implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A method, comprising:
   acquiring a character input instruction, and displaying candidate characters generated according to the character input instruction;
   acquiring a first instruction input by a user, wherein the first instruction selects a target candidate character in the candidate characters;
   acquiring a sliding gesture input by the user, wherein the sliding gesture terminates at a point between a first character and a second character of a displayed text string;
   determining, according to the sliding gesture, a sliding track corresponding to the sliding gesture, and determining a terminating point of the sliding track between the first character and the second character, wherein the sliding track is a track formed by action points of the sliding gesture on an output device, and wherein the target candidate character follows the sliding gesture to move along the sliding track to the terminating point of the sliding track between the first character and the second character;
   acquiring, according to the sliding track, a position that is selected by the user for inputting a character, wherein the position that is selected by the user for inputting the character is the terminating point of the sliding track between the first character and the second character, wherein the position that is selected by the user for inputting the character is acquired independently of a current position of a cursor, wherein during the selection of the terminating point, content displayed within a preset range of the terminating point is magnified using the terminating point as a center, and wherein the content displayed within the preset range of the terminating point comprises the first character and the second character; and
   inputting the target candidate character to the position that is selected by the user for inputting a character.

2. The method according to claim 1, wherein inputting the target candidate character to the position that is selected by the user for inputting the character comprises inputting the target candidate character to the terminating point of the sliding track.

3. The method according to claim 1, further comprising:
   displaying the sliding track, and displaying an identifier of the target candidate character on the sliding track.

4. The method according to claim 3, wherein the identifier is the target candidate character, and the method further comprises displaying the target candidate character in a preset area.

5. The method according to claim 3, wherein the identifier comprises:
   a position identifier of the target candidate character on the output device, wherein the position identifier is a relative position identifier of the target candidate character in displayed candidate characters.

6. A electronic device, comprising:
   a processor; and
   a non-transitory memory, wherein the memory stores computer executable instructions, and the processor is connected to the memory by using a communications bus;
   wherein the computer executable instructions, when executed by the processor, cause the electronic device to:
   acquire a character input instruction, and display candidate characters generated according to the character input instruction;
   acquire a first instruction input by a user, where the first instruction is used to select a target candidate character in the candidate characters;
   acquire a sliding gesture input by the user, wherein the sliding gesture terminates at a point between a first character and a second character of a displayed text string;
   determine, according to the sliding gesture, a sliding track corresponding to the sliding gesture, and determine a terminating point of the sliding track between the first character and the second character, wherein the sliding track is a track formed by action points of the sliding gesture on an output device, wherein the target candidate character follows the sliding gesture to move along the sliding track to the terminating point of the sliding track between the first character and the second character;
   acquire, according to the sliding track, a position that is selected by the user for inputting a character, wherein the position that is selected by the user for inputting the character is the terminating point of the sliding track between the first character and the second character, wherein the position that is selected by the user for inputting the character is acquired independently of a current position of a cursor, wherein during the selection of the terminating point, content displayed within a preset range of the terminating point is magnified using the terminating point as a center, and wherein the content displayed within the preset range of the terminating point comprises the first character and the second character; and
   input the target candidate character to the position that is selected by the user for inputting a character.

7. The electronic device according to claim 6, wherein the computer executable instructions, when executed by the processor, cause the electronic device to input the target candidate character to the terminating point of the sliding track.

8. The electronic device according to claim 6, wherein the computer executable instructions, when executed by the processor, further cause the electronic device to display the sliding track, and to display an identifier of the target candidate character on the sliding track.

9. The electronic device according to claim 8, wherein the identifier is the target candidate character, and the computer executable instructions, when executed by the processor, further cause the electronic device to display the target candidate character in a preset area.

10. The electronic device according to claim 8, wherein the identifier comprises: a position identifier of the target candidate character on the output device, and wherein the position identifier is a relative position identifier of the target candidate character in displayed candidate characters.

11. A electronic device, comprising:
    a processor; and
    a non-transitory memory, wherein the memory stores computer executable instructions, and the processor is connected to the memory by using a communications bus;
    wherein the computer executable instructions, when executed by the processor, cause the electronic device to:

acquire a character input instruction, and display candidate characters generated according to the character input instruction;

acquire a first instruction input by a user, where the first instruction is used to select a target candidate character in the candidate characters;

acquire a sliding gesture input by the user, wherein the sliding gesture terminates at a point between a first character and a second character of a displayed text string;

determine, according to the sliding gesture, a sliding track corresponding to the sliding gesture, and determine a terminating point of the sliding track between the first character and the second character, wherein the sliding track is a track formed by action points of the sliding gesture on an output device;

acquire, according to the sliding track, a position that is selected by the user for inputting a character, wherein the position that is selected by the user for inputting the character is the terminating point of the sliding track between the first character and the second character, wherein the position that is selected by the user for inputting the character is acquired independently of a current position of a cursor, wherein during the selection of the terminating point, content displayed within a preset range of the terminating point is magnified using the terminating point as a center, and wherein the content displayed within the preset range of the terminating point comprises the first character and the second character; and input the target candidate character to the position that is selected by the user for inputting a character.

12. The electronic device according to claim 11, wherein the target candidate character follows the sliding gesture to move along the sliding track to the terminating point of the sliding track between the first character and the second character.

13. The electronic device according to claim 11, wherein the computer executable instructions, when executed by the processor, cause the electronic device to input the target candidate character to the terminating point of the sliding track.

14. The electronic device according to claim 11, wherein the computer executable instructions, when executed by the processor, cause the electronic device to display the sliding track, and to display an identifier of the target candidate character on the sliding track.

15. The electronic device according to claim 14, wherein the identifier is the target candidate character, and the computer executable instructions, when executed by the processor, cause the electronic device to display the target candidate character in a preset area.

16. The electronic device according to claim 14, wherein the identifier comprises: a position identifier of the target candidate character on the output device, wherein the position identifier is a relative position identifier of the target candidate character in displayed candidate characters.

* * * * *